(12) United States Patent
Cooke et al.

(10) Patent No.: US 11,774,697 B2
(45) Date of Patent: Oct. 3, 2023

(54) FIBER OPTIC CABLE ASSEMBLY WITH PULLING GRIP ASSEMBLY AND RELATED METHODS

(71) Applicant: CORNING RESEARCH & DEVELOPMENT CORPORATION, Corning, NY (US)

(72) Inventors: Terry Lee Cooke, Hickory, NC (US); Sherrh Clint Reinhardt, Hickory, NC (US)

(73) Assignee: Corning Research & Development Corporation, Corning, NY (US)

( * ) Notice: Subject to any disclaimer, the term of this patent is extended or adjusted under 35 U.S.C. 154(b) by 0 days.

(21) Appl. No.: 17/521,130

(22) Filed: Nov. 8, 2021

(65) Prior Publication Data

US 2022/0163747 A1 May 26, 2022

Related U.S. Application Data

(60) Provisional application No. 63/117,749, filed on Nov. 24, 2020.

(51) Int. Cl.
  *G02B 6/44* (2006.01)
  *G02B 6/54* (2006.01)

(52) U.S. Cl.
  CPC ........... *G02B 6/545* (2023.05); *G02B 6/4479* (2013.01)

(58) Field of Classification Search
  CPC .............................. G02B 6/4465; G02B 6/441
  See application file for complete search history.

(56) References Cited

U.S. PATENT DOCUMENTS

| 4,368,910 A | 1/1983 | Fidrych |
| 4,453,291 A | 6/1984 | Fidrych |
| 4,460,159 A * | 7/1984 | Charlebois ............. H02G 1/081 385/100 |
| 4,514,005 A | 4/1985 | Fallon |
| 5,133,583 A | 7/1992 | Wagman et al. |
| 5,480,203 A | 1/1996 | Favalora et al. |
| 5,863,083 A * | 1/1999 | Giebel ................. G02B 6/4471 385/136 |

(Continued)

FOREIGN PATENT DOCUMENTS

| DE | 20213015 U1 | 12/2003 |
| EP | 0316535 A2 | 5/1989 |

(Continued)

OTHER PUBLICATIONS

International Search Report and Written Opinion of the International Searching Authority; PCT/US2021/059333; dated Feb. 22, 2022; pp. 14; European Patent Office.

*Primary Examiner* — Eric Wong
(74) *Attorney, Agent, or Firm* — Adam R. Weeks

(57) ABSTRACT

A fiber optic cable assembly comprises: a cable jacket; distinct groups of optical fibers carried within the cable jacket and extending beyond a first end of the cable jacket; a furcation body positioned on the first end of the cable jacket such that the distinct groups of optical fibers have respective fiber end sections extending beyond the furcation body; and a pulling grip assembly protecting the fiber end sections. The pulling grip assembly includes a pulling band releasably secured to the cable jacket by a clamp, and is configured to withstand significant tensile loads despite being easily removable.

16 Claims, 10 Drawing Sheets

(56) References Cited

U.S. PATENT DOCUMENTS

| | | |
|---|---|---|
| 6,993,237 B2 | 1/2006 | Cooke et al. |
| 7,869,685 B2 | 1/2011 | Hendrickson et al. |
| 8,385,712 B2 | 2/2013 | Ahmed |
| 8,620,130 B2 | 12/2013 | Cooke et al. |
| 8,630,523 B2 | 1/2014 | Smith et al. |
| 8,718,425 B2 | 5/2014 | Piña et al. |
| 9,110,268 B2 | 8/2015 | Leonard et al. |
| 9,453,982 B2 | 9/2016 | Nhep et al. |
| 9,608,426 B2 | 3/2017 | Tatat et al. |
| 10,001,619 B2 | 6/2018 | Thompson et al. |
| 10,067,310 B2 | 9/2018 | Compton et al. |
| 10,295,775 B1 | 5/2019 | Zhu et al. |
| 11,300,749 B2 | 4/2022 | Hendrickson et al. |
| 2008/0175548 A1 | 7/2008 | Knecht et al. |
| 2010/0150504 A1 | 6/2010 | Allen et al. |
| 2012/0308184 A1* | 12/2012 | Pina .................. G02B 6/4465 385/102 |
| 2013/0294735 A1* | 11/2013 | Burris ................ G02B 6/4471 385/101 |
| 2015/0362693 A1 | 12/2015 | Nhep et al. |
| 2018/0067275 A1 | 3/2018 | Levy |
| 2019/0004273 A1 | 1/2019 | Faulkner et al. |
| 2021/0302657 A1* | 9/2021 | Petersen ............... G02B 6/443 |

FOREIGN PATENT DOCUMENTS

| | | |
|---|---|---|
| GB | 2470584 A | 12/2010 |
| JP | 07-027958 A | 1/1995 |
| WO | 2009/040567 A1 | 4/2009 |
| WO | 2010/105674 A1 | 9/2010 |
| WO | 2013/112396 A1 | 8/2013 |
| WO | 2019/010291 A1 | 1/2019 |
| WO | 2019/079425 A1 | 4/2019 |
| WO | 2019/079460 A1 | 4/2019 |

* cited by examiner

FIBER OPTIC CABLE ASSEMBLY WITH PULLING GRIP ASSEMBLY AND RELATED METHODS

PRIORITY APPLICATION

This application claims the benefit of priority of U.S. Provisional Application No. 63/117,749, filed on Nov. 24, 2020, the content of which is relied upon and incorporated herein by reference in its entirety.

BACKGROUND

This disclosure relates generally to optical connectivity, and more particularly to fiber optic cable assemblies that include a pulling grip assembly providing sealed protection for fiber end sections and capable of withstanding significant loads, along with related methods for such fiber optic cable assemblies.

Large amounts of data and other information transmitted over the internet has led businesses and other organizations to develop large scale data centers for organizing, processing, storing, and/or disseminating large amounts of data. Data centers contain a wide range of communication equipment including, for example, servers, networking switches, routers, storage subsystems, etc. Data centers further include a large amount of cabling and equipment racks to organize and interconnect the communication equipment in the data center. For example, optical fiber cables and rack-mounted hardware to support optical connections are used extensively in data centers. Optical fibers can support very high bandwidths with lower signal loss compared to traditional data transmission mediums (e.g., copper wires).

The connections between communication equipment in large-scale data centers is typically not confined to a single building. May modern data centers include multi-building campuses having, for example, one primary or main building and a number of auxiliary buildings in close proximity to the main building. All the buildings on the campus are interconnected by a local fiber optic network. More particularly, each of the auxiliary buildings are typically connected to the main building by one or more high fiber-count optical cables referred to as "trunk cables" or "interconnect cables". Each trunk cable may include thousands of optical fibers. Indeed, fiber counts of 3,456 or higher are now common.

To provide optical connectivity within a building, the optical fibers of an interconnect cable are typically spliced to optical fibers of indoor distribution cables. The splices may be stored and organized in a splice cabinet from which the indoor distribution cables extend. More specifically, the splice cabinet holds numerous splice trays that each receives a group of optical fibers from the interconnect cable that have been spliced to a group of optical fibers associated with the indoor distribution cables. Fusion splicing is commonly used as the primary technique for splicing the two groups of optical fibers together before the splices are stored and organized in the splice trays. The indoor distribution cables exit the splice cabinet and extend to desired locations within the building, such as to designated rows of equipment racks. Connections to the communication equipment in the equipment racks are ultimately made by the indoor distribution cables or other cables that are part of a structured cabling system for the building.

The amount of labor and time for connecting a trunk cable to the IT equipment in the main building on the data center campus is significant. In a typical installation process, it may take two technicians approximately two-weeks of time to fusion splice the optical fibers of a interconnect cable to corresponding optical fibers of indoor cables in the main building. Additionally, fusion splicing is a labor-intensive method for connecting optical fibers that is typically performed under field conditions, as opposed to under more highly controlled factory conditions. Thus, the quality of the splicing and the attenuation of the optical signal through the splice may vary widely depending on the field technicians' skill and experience.

Attempts to address these challenges may involve pre-terminating an interconnect cable with optical connector components that define a connection interface so that splicing is not required in the field. The connection interfaces can instead mate with corresponding connection interfaces (e.g., using an adapter) on indoor cables. However, pre-terminating cables creates its own challenges. In particular, the terminations involve components that may make it difficult to fit a large number of terminated optical fibers into a small space. This is particularly important for data center campuses, as the interconnect cables must typically be pulled through one or more ducts during installation. The number and size (i.e., diameter) of the ducts is limited. Additionally, the intended pathway for the interconnect cable may present routing challenges, requiring significant forces to be applied to route the cable to its intended destination. The pre-terminated ends of optical fibers in the interconnect cable must also be protected from environmental conditions during the routing.

Although various designs for pulling grips (also referred to as "pulling socks") are known to help route fiber optic cables during installation, there remains a need to better address the variety of challenges driven by high fiber-count cables and modern data center environments.

SUMMARY

Embodiments of fiber optic cable assemblies are provided in this disclosure. The fiber optic cable assemblies may be pre-terminated or unterminated, and comprise a pulling grip assembly. Pulling grip assembly designs according to this disclosure are particularly advantageous for pre-terminated fiber optic cable assemblies because of the high loads the pulling grip assembly designs can withstand in a small footprint, thereby allowing a large number of pre-terminated optical fibers to be pulled through small ducts.

According to one embodiment, a fiber optic cable assembly comprises: a cable jacket; distinct groups of optical fibers carried within the cable jacket and extending beyond a first end of the cable jacket; a furcation body positioned on the first end of the cable jacket such that the distinct groups of optical fibers have respective fiber end sections extending beyond the furcation body; and a pulling grip assembly. The pulling grip assembly includes: a bag received over the fiber end sections and secured to the furcation body so that the bag forms a seal with the furcation body; a tube extending from the furcation body and over the bag so that the fiber end sections are within the tube; a clamp releasably secured around the cable jacket on a side of the furcation body opposite the fiber end sections; and a pulling band having a first end portion and a second end portion secured to the cable jacket by the clamp. The pulling band includes a first length and a second length that extend respectively from the first end portion and the second end portion along the tube and that form a loop beyond the tube. The pulling grip assembly also includes a cover extending from the furcation body and over the tube. The cover also extends over the first length and the second length of pulling band that are along the tube. An end region of the cover extends beyond a distal end of the tube, and the loop formed beyond the tube by the first length and the second length of the pulling band is accessible beyond the end region of the cover.

In some embodiments, the cover comprises an expandable mesh material and is secured over the cable jacket by the clamp. An end cap may be positioned over the distal end of the tube, with the end region of the cover and the loop of the pulling band extending through the end cap.

As mentioned above, the cable assembly may be a pre-terminated cable assembly. According to one such embodiment, the cable assembly further comprises a plurality of connection interfaces each terminating one or more respective groups of the distinct groups of optical fibers that extend beyond the furcation body to define pre-terminated fiber end sections of the distinct groups of optical fibers (i.e., the fiber end sections mentioned above are now pre-terminated). The plurality of connection interfaces may be, for example, a plurality of ferrules that each terminate single group or multiple groups of the distinct groups of optical fibers. The ferrules may or may not be parts of complete optical connectors. Thus, in some embodiments, the ferrules may be parts of incomplete optical connectors (e.g., optical connectors lacking a connector housing that defines a mechanical reference datum as a latching feature).

Additional features and advantages will be set out in the detailed description which follows, and in part will be readily apparent to those skilled in the technical field of optical connectivity. It is to be understood that the foregoing general description, the following detailed description, and the accompanying drawings are merely exemplary and intended to provide an overview or framework to understand the nature and character of the claims.

BRIEF DESCRIPTION OF THE DRAWINGS

The accompanying drawings are included to provide a further understanding, and are incorporated in and constitute a part of this specification. The drawings illustrate one or more embodiment(s), and together with the description serve to explain principles and operation of the various embodiments. Features and attributes associated with any of the embodiments shown or described may be applied to other embodiments shown, described, or appreciated based on this disclosure.

DETAILED DESCRIPTION

Various embodiments will be clarified by examples in the description below. In general, the description relates to a fiber optic cable assembly that includes a cable and a pulling grip assembly (also referred to as simply "pulling grip" or as a "pulling sock") for pulling the cable through ducts or the like. The pulling grip assembly is designed to protect the ends of optical fibers extending from the cable from both forces and environmental conditions (e.g., moisture) that the fiber optic cable assembly may experience during handling, storage, installation, and use. Doing so can be particularly challenging for high fiber-count cables, such as those including 3,456 or more optical fibers that have been pre-terminated with optical connector components (e.g., ferrules) or full optical connectors.

To facilitate discussion and provide context, an exemplary environment and use for high fiber-count cables will first be described. A description of an example high fiber-count, pre-terminated cable will then follow, before ultimately focusing on details of a pulling grip assembly for that cable. The pulling grip assembly may, however, be used in connection with a wide variety of cable designs. The cable designs need not necessarily include high fiber-counts even though aspects of this disclosure may be particularly advantageous for high fiber-counts. Thus, details in this disclosure that are not related to the pulling grip assembly should not be seen as limiting the scope of claims in this disclosure unless specifically recited in those claims.

Figure 1:
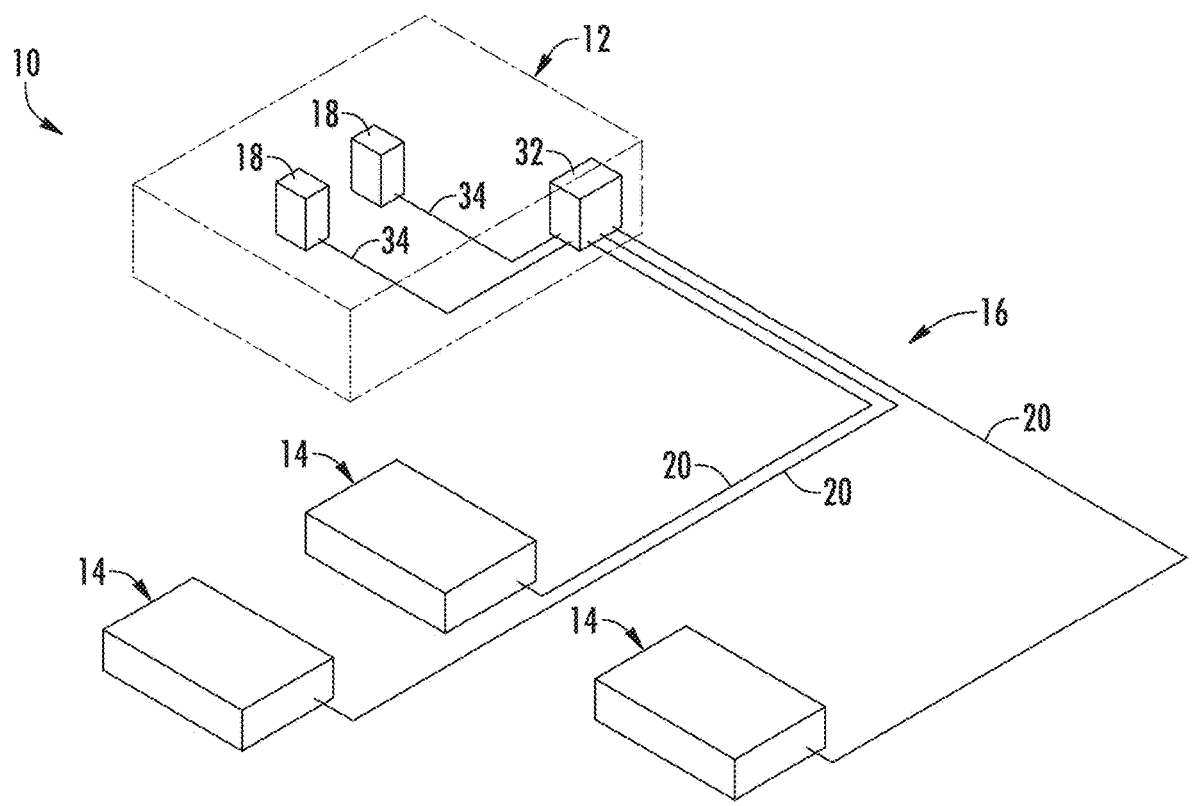
FIG. 1 is a schematic illustration of a data center campus interconnected according to an exemplary embodiment of the disclosure.

As illustrated in FIG. 1, a modern-day data center 10 may include a collection of buildings (referred to as a data center campus) having, for example, a main building 12 and one or more auxiliary buildings 14 in close proximity to the main building 12. While three auxiliary buildings are shown, there may be more or less depending on the size of the campus. The data center 10 provides for a local fiber optic network 16 that interconnects the auxiliary buildings 14 with the main building 12. The local fiber optic network 16 allows communication equipment 18 in the main building 12 to communicate with various communication equipment (not shown) in the auxiliary buildings 14. In the exemplary embodiment shown, the local fiber optic network 16 includes interconnect cables 20 (also referred to as "outside plant cables 20" or "trunk cables 20") extending between the main building 12 and each of the auxiliary buildings 14.

The interconnect cables 20 may be similar to any of the cables described in International Patent Application Publication No. WO 2019/010291 A1 ("the '291 publication"), the disclosure of which is fully incorporated herein by reference. Thus, although a brief description of one of the interconnect cables 20 is provided below to introduce aspects related to this disclosure, reference can be made to the '291 publication for an understanding of other aspects and variations.

Figure 2:
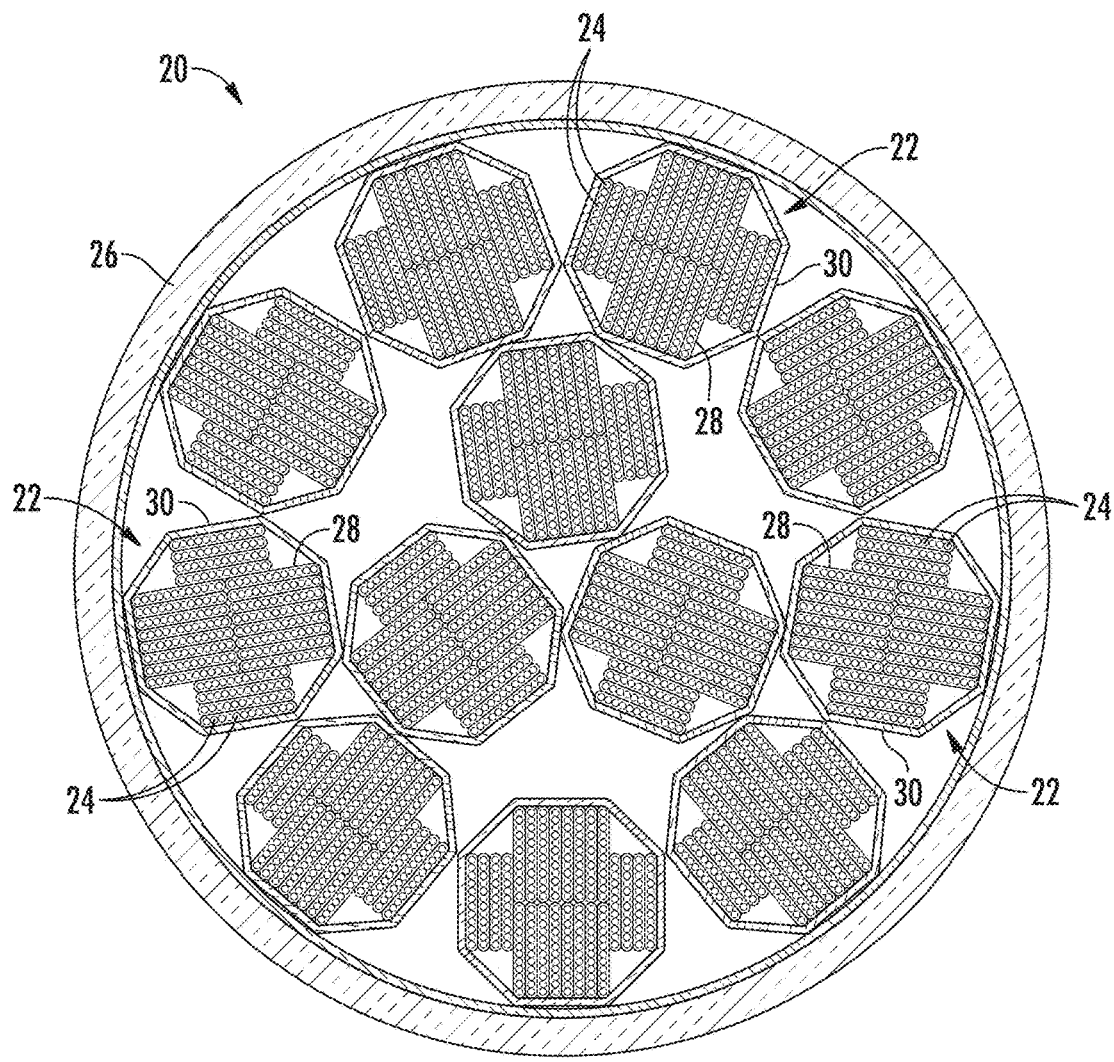
FIG. 2 is a cross-sectional view of an exemplary interconnect cable that interconnects buildings on the data center campus.

As illustrated in FIG. 2, an example one of the interconnect cables 20 generally includes a high fiber-count arrangement of optical fibers 24 (e.g., 2,880 or 3,456 or more optical fibers) for passing data and other information through the local fiber optic network 16. The interconnect cable 20 includes a plurality of subunits 22, and each subunit 22 is configured to carry a pre-selected number of optical fibers 24. Although the interconnect cable 20 is shown as including twelve subunits 22, the number of subunits 22 may be more or less than this number in alternative embodiments. The subunits 22 may be arranged within an outer protective sheath 26 (also referred to as "outer cable jacket 26" or simply "cable jacket 26" or "outer jacket 26"), as is generally known in the industry. As mentioned above, each of the subunits 22 is configured to carry a pre-selected number of optical fibers 24. By way of example and without limitation, each subunit 22 may be configured to carry 144 or 288 optical fibers 24. It should be recognized, however, that more or less optical fibers 24 may be carried by each of the subunits 22.

The optical fibers 24 in the subunits 22 may be arranged in different groups (i.e., distinct groupings, even though the groupings may have the same number of optical fibers 24). As an example, the optical fibers 24 may be configured as a plurality of optical fiber ribbons 28 ("ribbons 28"). Each ribbon 28 includes a plurality of the optical fibers 24 arranged in a generally side-by-side manner (e.g., a linear array, as shown, or a rolled/folded array). Such ribbons are generally known and thus will not be described further in this disclosure. Each ribbon 28 may include, for example, eight, twelve, sixteen, or any other number of the optical fibers 24. The ribbons 28 of a subunit 22 may be arranged within a subunit sheath 30 ("subunit jacket 30"), which may be a thin layer of material that has been extruded over the ribbons 28.

In the example illustrated in FIG. 2, the interconnect cables 20 from the auxiliary buildings 14 (FIG. 1) are routed to a distribution cabinet 32 (also referred to as "distribution enclosure 32") housed in the main building 12. In alternative embodiments, there may be multiple distribution cabinets 32 in the main building for receiving the interconnect cables 20. Thus, there may be one or more distribution cabinets 32.

Figure 3:
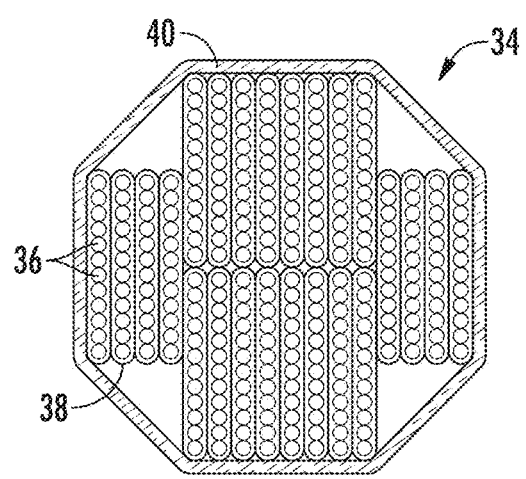
FIG. 3 is a cross-sectional view of one example of an indoor cable used within buildings of the data center campus shown in FIG. 1.

Within the main building 12, a plurality of indoor fiber optic cables 34 ("indoor cables 34") are routed between the communication equipment 18 and the one or more distribution cabinets 32. In an exemplary embodiment and as illustrated in FIG. 3, each of the indoor cables 34 may be configured similar to the subunits 22, at least in terms of fiber count and fiber groupings, and thereby be configured to carry a pre-selected number of optical fibers 36. By way of example and without limitation, each indoor cable 34 may be configured to carry 144 or 288 of the optical fibers 36. It should be recognized, however, that more or less optical fibers 36 may be carried by each of the indoor cables 34.

Similar to the optical fibers 24 of the subunits 22, the optical fibers 36 in the indoor cables 34 may be configured as a plurality of optical fiber ribbons 38 ("ribbons 38"). Thus, each ribbon 38 may include a plurality of optical fibers 36 arranged in a generally side-by-side manner (e.g., in a linear array or in a rolled/folded array). Again, such ribbons 38 are generally known in the industry and thus will not be described further in this disclosure. Each ribbon 38 may include, for example, eight, twelve, sixteen, or any other number of the optical fibers 36. The ribbons 38 of an indoor cable 34 may be arranged within an outer protective sheath 40 (also referred to as "cable outer jacket 40" or simply "cable jacket 40"), as is generally known in the industry.

Figure 4:
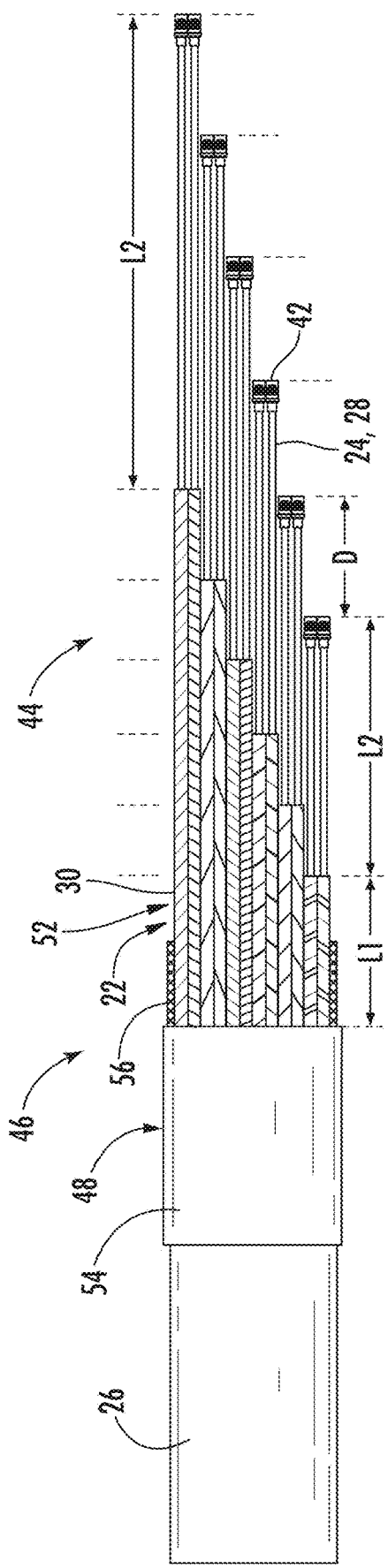
FIG. 4 is a schematic view of an end portion of the interconnect cable of FIG. 2 having subunits pre-terminated with ferrules to form a pre-terminated cable according to one example embodiment.

Although only the interior of the main building 12 is schematically shown in FIG. 4 and discussed above, each of the auxiliary buildings 14 may house similar equipment for similar purposes. Thus, although not shown, each of the interconnect cables 20 may be routed to one or more distribution cabinets 32 in one of the auxiliary buildings 14 in a manner similar to that described above. Furthermore, each of the auxiliary buildings 14 may include indoor cables 34 that extend between communication equipment 18 and the one or more distribution cabinets 32 of the auxiliary building 14.

In accordance with an aspect of this disclosure, at least one of the interconnect cables 20 extending between buildings 12, 14 and at least some of the indoor cables 34 within the buildings 12, 14 may be pre-terminated. That is, at least one of the interconnect cables 20 has at least one end where the optical fibers 24 of interconnect cable 20 are terminated by a connection interface prior to being sent out into the field for installation in the local fiber optic network 16, such that the optical fibers 24 have pre-terminated fiber end sections. Likewise, at least some of the indoor cables 34 (e.g., those intended to be coupled to the subunits 22 of the interconnect cable(s) 20 that are pre-terminated) have at least one end where the optical fibers 36 are terminated by a connection interface prior to being sent out into the field for installation in the local fiber optic network 16, such that the optical fibers 36 have pre-terminated fiber end sections. The terminations of the interconnect cable(s) 20 and indoor cables 34 instead occur during their respective manufacture (i.e., as part of a cable assembly manufacturing process). Thus, the word "pre-terminated" is used in this disclosure to refer to terminations of optical fibers that take place by the manufacturer of the resulting cable assembly, prior to deployment to "the field" (customers, customer sites, etc.).

As used in this disclosure, "connection interface" refers to an optical connector, optical connector sub-assembly, or one or more optical connector components, such as ferrules, that facilitate coupling of the optical fibers on which they are installed to other optical fibers that are terminated with a same or different connector interface. In one embodiment, for example, the interconnect cables 20 may be pre-terminated with a plurality of ferrules. Each ribbon 28 may be terminated with a respective ferrule, such as 12-fiber ribbons each being terminated with a respective 12-fiber MT ferrule. Alternatively, groups of two or more ribbons 28 may be terminated with the same ferrule, such as groups of two 12-fiber ribbons each being terminated with a respective 24-fiber MT ferrule. There does not need to be a connector housing (also referred to simply as a "housing", or as "connector body" or simply "body") receiving the ferrule. It may just be the ferrule terminating the group(s) of optical fibers, or just the ferrule and components other than a connector housing such that the connection interface itself remains something less than an optical connector. As is known in the industry, optical connectors are designed provide two primary functions: alignment of optical fibers for optical coupling, and mechanical retention to maintain that alignment. A ferrule is typically the primary component for optical alignment purposes, and the connector housing is typically the primary component for retention purposes since it typically includes a coupling mechanism (e.g., a latch feature for cooperating with a complementary latching feature of an adapter). The connector housing defines at least one mechanical reference plane or datum for retention. A connection interface not having such a connector housing is considered an incomplete optical connector in this disclosure.

FIG. 4 schematically illustrates an end portion 44 of one of the interconnect cables 20 pre-terminated with a plurality of ferrules 42 (FIG. 5) to form a pre-terminated cable 46 (for convention, "end portion 44" will also be used in this disclosure to refer to an end portion of the pre-terminated cable 46). The termination involves not only the installation of ferrules 42, but also preparing the end portion 44 of the interconnect cable 20 for such installation. To this end, the pre-terminated cable 46 includes a furcation body 48 associated with a first end 50 of the cable jacket 26. For example, the furcation body 48 may be installed on the first end 50 such that the cable jacket 26 ends within the furcation body 48. The furcation body 48 represents a "breakout", "branching", or "fanout" point on the interconnect cable 20, as end sections 52 of the subunits 22 extend from the furcation body 48 and beyond the first end 50 of the cable jacket 26 so that the subunits 22 have more freedom to spread out. Various types of furcation bodies are known. In the embodiment shown, and as will be described in further detail below, the furcation body 48 comprises a shell 54 positioned on the first end 50 of the cable jacket 26 and polymer material filling the shell 54 (around the subunits 22). The polymer material may be a cured adhesive, such as epoxy, so that the shell 54 is secured to the cable jacket 26, an inner sheath 56 of the cable, and at least some of the subunit jackets 30.

Figure 5:
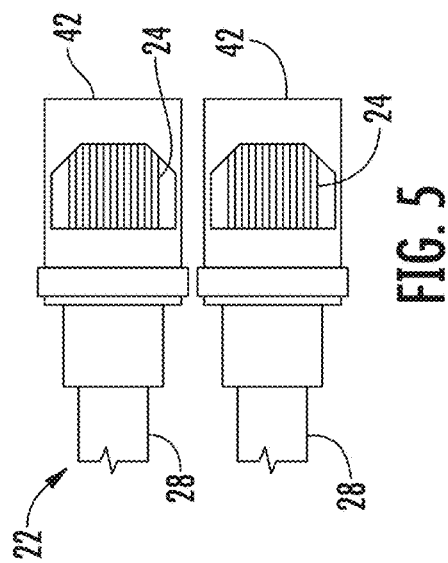
FIG. 5 is a close-up schematic view of the ferrules associated with two of the subunits in FIG. 4.

In the embodiment shown in FIG. 4, the end sections 52 of the subunits 22 each include the associated subunit jacket 30 extending a certain length from the shell 54 of the furcation body 48. The associated group of optical fibers 24 then extend a certain length from (i.e., beyond) the associated subunit jacket 30. The optical fibers 24 are pre-terminated with connection interfaces (ferrules 42), forming pre-terminated fiber end sections, and in this embodiment, the optical fibers 24 are in a ribbonized form before such terminations. For convenience, only a representative ribbon 28 and representative ferrule 42 is schematically shown for each subunit 22 in FIG. 4. A close-up of the representative ribbon 28 and representative ferrule 42 for two of the subunits 22 is schematically shown in FIG. 5. As mentioned above, each subunit 22 may include a plurality of ribbons 28, such as twelve ribbons 28 that each have twelve optical fibers 24 (144 fiber count per subunit 22), twenty-four ribbons 28 that each have twelve optical fibers 24 (288 fiber count per subunit 22), or the like.

Referring back to FIG. 4, the end sections 52 of the subunits 22 are grouped in pairs, with the end sections 52 of a given pair having substantially the same length. For example, the lowermost pair in FIG. 4 includes the subunit jackets 30 extending a length L1 from the shell 54 of the furcation body 48, and the optical fibers 24 extending a length L2 from the subunit jacket 30. The total length of the end section 52 (i.e., L1+L2) may be referred to as the "leg length". The different pairs of end sections 52 have different leg lengths to provide a staggered arrangement of the ferrules 42. This staggering allows the pre-terminated cable 46 to be placed within a smaller pulling grip assembly (compared to if there were no staggering), and therefore, fit within smaller ducts or the like.

In FIG. 4, each successive group of end sections 52 has a leg length that is a distance D longer than the leg length of the preceding group. Thus, each group of end sections 52 is longer by distance D than the previous group such that there is substantially uniform (i.e., uniform or intended to be uniform) staggering of the different groups of the ferrules 42. In alternative embodiments, the staggering may be non-uniform. The different leg lengths may be due to the subunit jackets 30 extending further from the shell 54 of the furcation body 48. Thus, the length L2 that the optical fibers 24 extend beyond the corresponding subunit jacket 30 may remain substantially the same (i.e., the same or intended to be the same). A consistent length of exposed ribbons 28 may allow consistent processing by the manufacturer of the pre-terminated cable 46 when terminating the optical fibers 24. In other words, termination processes may be based on a certain exposed length of each ribbon 28 (e.g., for fixtures, stripping equipment, etc.). When that length is provided, the termination processes may be performed in a repeatable manner. Alternative embodiments without consistent lengths of exposed ribbons 28 are nevertheless within the scope of this disclosure as well. Further, in some embodiments involving different cable designs, optical fibers (in a ribbonized or non-ribbonized form) may not have exposed/uncovered end sections.

Figure 6:
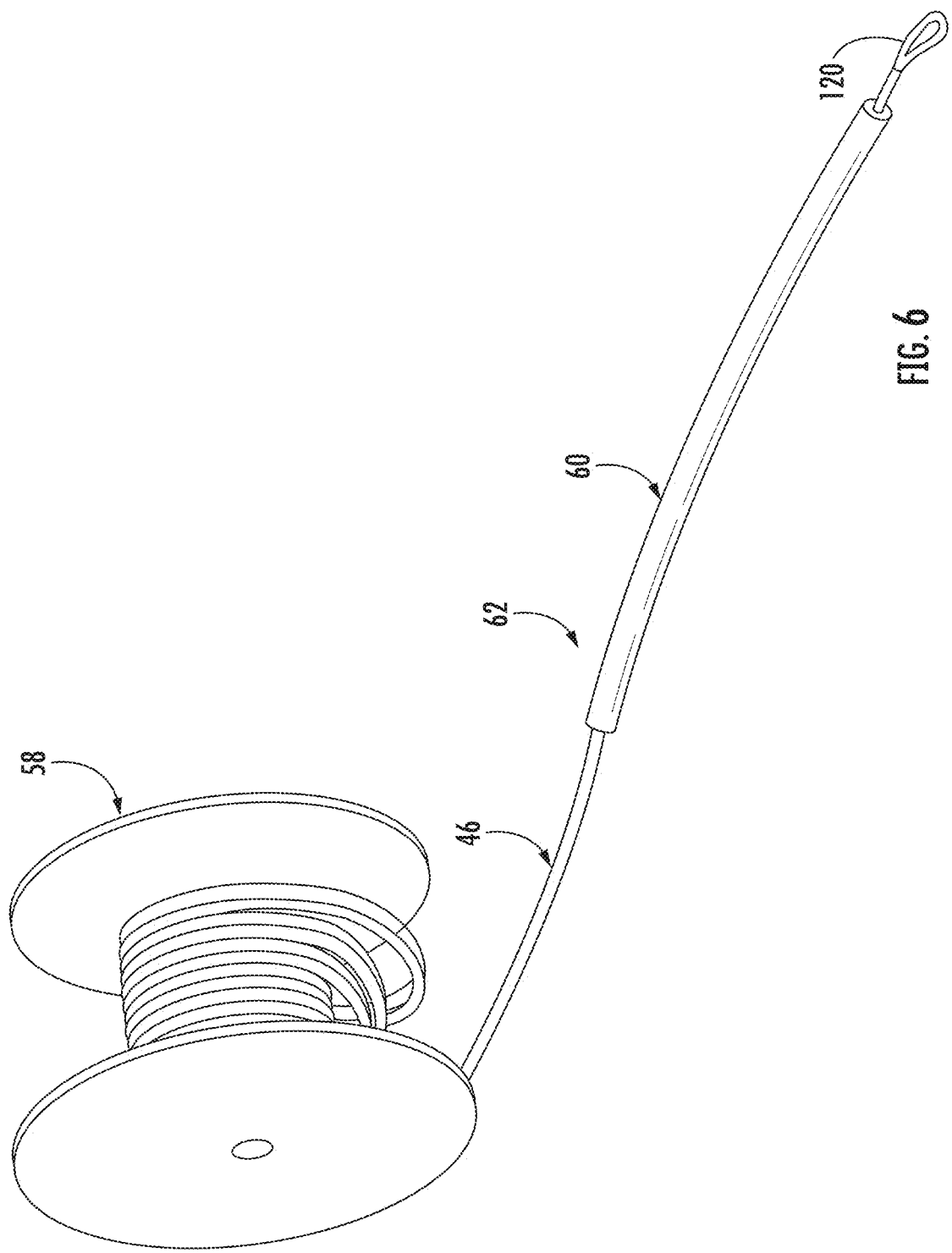
FIG. 6 is a perspective of the interconnect cable of FIG. 2 stored on a cable reel and a pulling grip assembly ("pulling grip") covering the end portion of the interconnect cable of FIG. 4.

FIG. 6 illustrates the pre-terminated cable 46 on a reel 58 and an example of a pulling grip assembly 60 (also referred to as "pulling grip 60" or "pulling sock 60") installed over an end portion of the pre-terminated cable 46 (e.g., the end portion 44 represented in FIG. 4) to form a pre-terminated fiber optic cable assembly 62 ("cable assembly 62"). The pulling grip assembly 60 covers all of the ferrules 42 associated with the end portion 44 of the pre-terminated cable 46. It has already been mentioned how the staggering of the ferrules 42 can help minimize the footprint of the pulling grip assembly 60. For a given pulling grip design, the maximum width/diameter can be less than what it would need to be to accommodate the interconnect cable 20 being pre-terminated with assemblies considered to be complete optical connectors. While the design of the pre-terminated cable 46 may contribute an overall smaller footprint for the large number of pre-terminated optical fibers, the pulling grip assembly 60 complements this design by likewise having a small footprint to provide protection for a high density of pre-terminated optical fibers. Despite the small footprint, the pulling grip assembly can withstand significant tensile loads that may be required to pull such a large number of pre-terminated fiber end sections through a duct.

Figure 7:
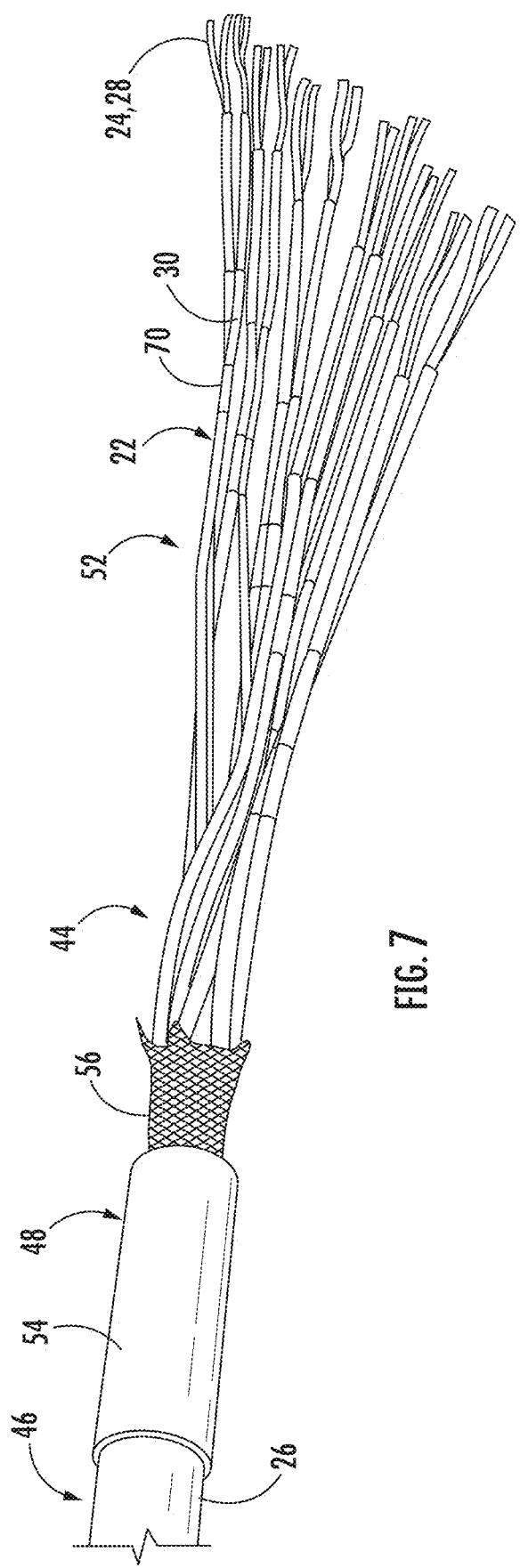
FIG. 7 is a perspective view of an end portion of the interconnect cable of FIG. 2 before terminating optical fibers of the subunits.
Figure 8:
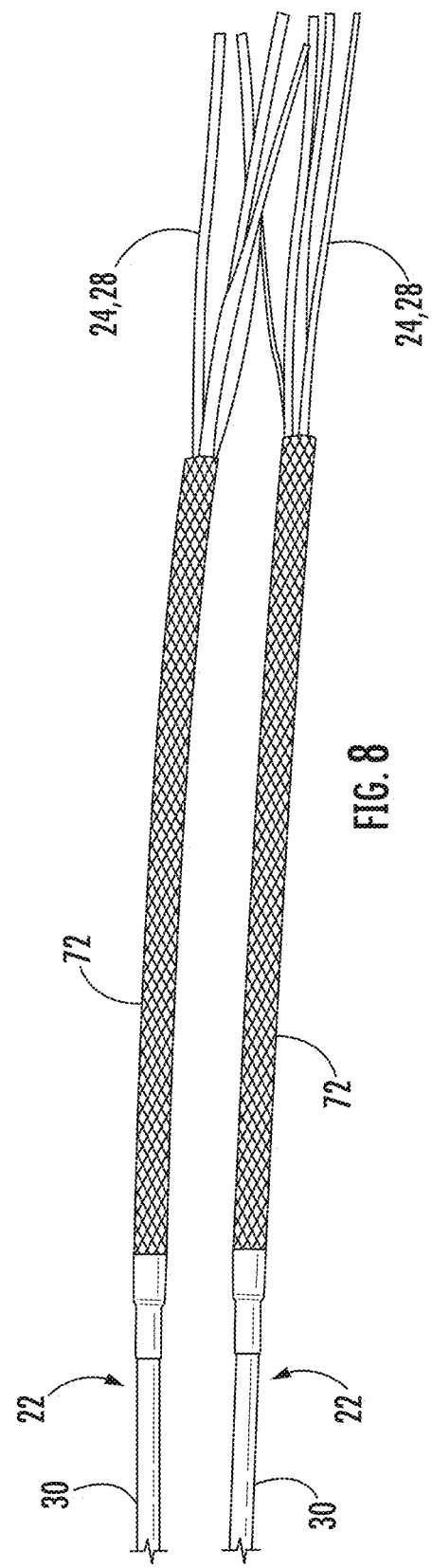
FIG. 8 is schematic view of two example subunits of the interconnect cable of FIG. 2 after installing subunit covers on the subunits.

To best appreciate the design of the pulling grip assembly 60, an example installation of the pulling grip assembly 60 onto the pre-terminated cable 46 to form the cable assembly 62 will be described. Beginning with FIG. 7, the end portion 44 of the pre-terminated cable 46 is first prepared for the installation by organizing the end sections 52 of the subunits 22. As mentioned above in connection with FIG. 4, the subunits 22 may be grouped in pairs. Each pair of the subunits 22 may be secured or otherwise held together using a sleeve 70 slid onto the subunits, tape applied to the subunits, hook-and-loop fasteners (e.g., Velcro®), or the like. Additionally, each of the subunits 22 may include a respective subunit cover 72 (FIG. 8) secured to the associated subunit jacket 30. FIG. 8, for example, illustrates two representative subunits 22 (e.g., an example pair of the subunits 22) each having a subunit cover 72 in the form a mesh material. The subunit covers 72 are secured to the subunit jackets 30 using tape, heat shrink sleeves, or the like, and extend beyond ends of the subunit jackets 30 so as to cover a portion of the ribbons 28.

Figure 9:
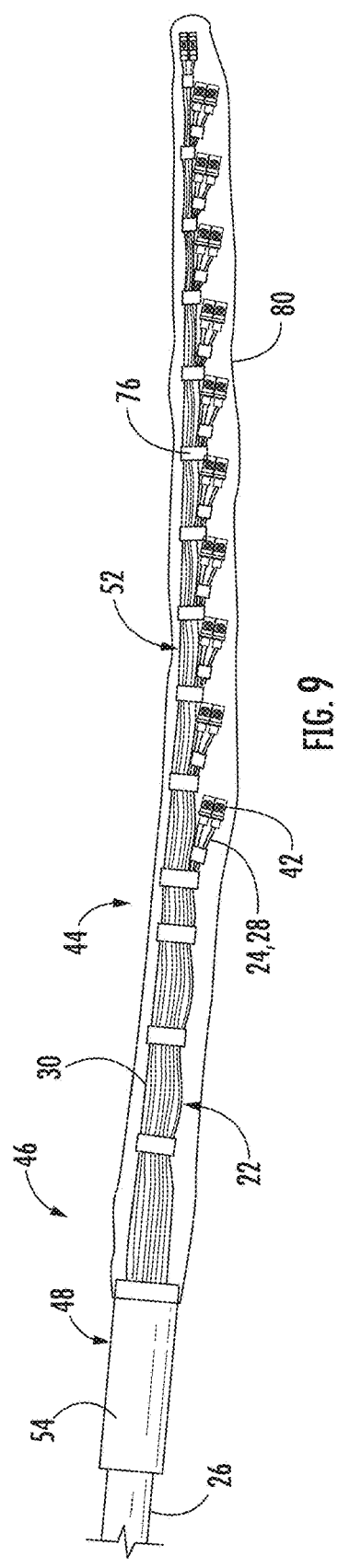
FIG. 9 is a schematic view the end portion of the interconnect cable of FIG. 4 having the subunits organized for installation of the pulling grip assembly of FIG. 6, with such installation beginning with a bag of the pulling grip assembly being arranged on the end portion of the interconnect cable.

The ribbons 28 are terminated with the connection interfaces (e.g., ferrules 42) before or after these steps. FIG. 9 illustrates the terminated fiber end sections prepared for installation of the pulling grip assembly 60. As discussed above with respect to FIG. 4, different pairs of the subunits 22 have different leg lengths to provide a staggered arrangement of the ferrules 42. Also like FIG. 4, FIG. 9 is schematic in nature and only illustrates a representative ferrule 42 per subunit 22 for convenience, when in reality each subunit 22 may include a plurality of ribbons 28 and ferrules 42. Tape, hook-and-loop fasteners (e.g., Velcro®), or other material may be used as bands 76 at various points along the length of the end portion 44 of the pre-terminated cable 46. For example, the subunits 22 of a given pair of subunits 22 may be banded together as discussed above, and this pair of subunits 22 then may be banded to other pairs of subunits 22 that have longer leg lengths. The bands 76 may be applied around the subunit jackets 30. Alternatively or additionally, groups of the ribbons 28 may be banded together and/or banded to other groups of the ribbons 28.

Once the end sections 52 of the subunits 22 have been organized, a bag 80 may be placed over the end sections 52 and secured to the furcation body 48. In some embodiments, the bag 80 may be formed from plastic, such as polyethylene (e.g., a "poly bag"). The bag 80 is secured to the shell 54 of the furcation body 48 in a manner that forms a seal. As an example, an end of the bag 80 may be positioned over the shell 54, and then self-fusing tape or a heat shrink may be applied over the end of the bag 80 and a portion of the shell 54. The term "bag" is used in this disclosure to generally refer to a closed-end structure having an internal cavity, and may be a readily-available product or a collection of elements assembled to form a bag (e.g., two sheets having sides joined together). The bag 80 and furcation body 48 provide watertight protection for the pre-terminated fiber end sections of the cable assembly 62. As a precaution, and to help prevent condensation within the internal cavity of the bag 80, one or more desiccant packages (not shown) may be included in the bag 80 with the pre-terminated fiber end sections.

Figure 10:
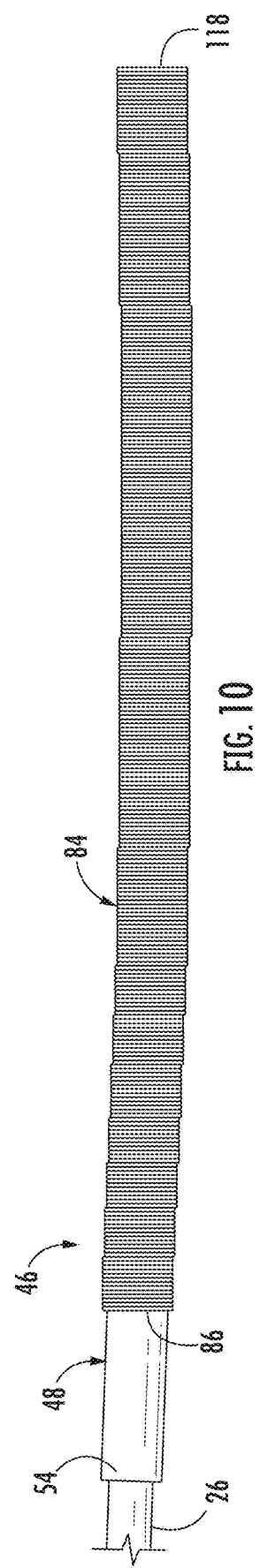
FIG. 10 is a schematic view similar to FIG. 9, but illustrates a tube of the pulling grip assembly installed on the end portion of the interconnect cable.
Figure 12:
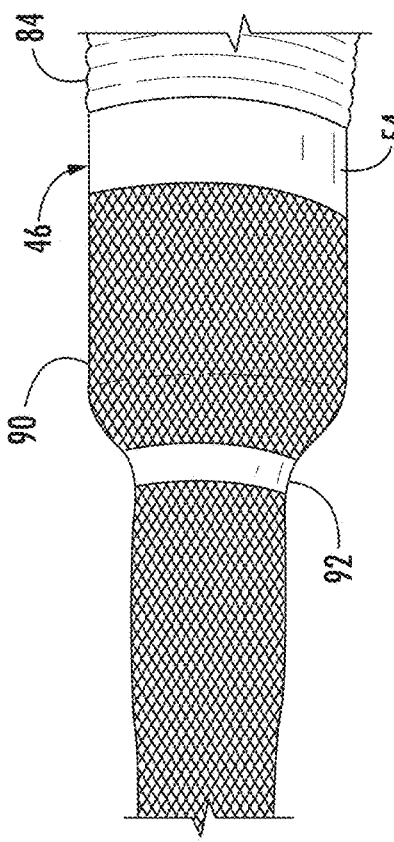
FIGS. 11 and 12 are schematic views of a portion of the interconnect cable of FIG. 4 after the tube of FIG. 10 is installed, with FIGS. 11 and 12 illustrating a cover of the pulling grip assembly being advanced over and past the tube.
Figure 11:
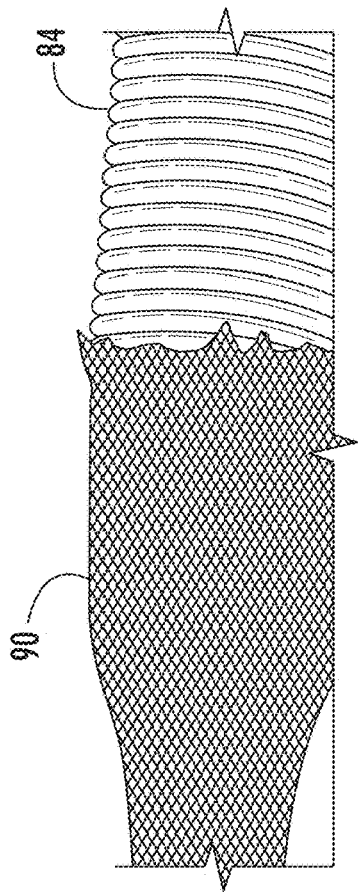

Next, a tube 84 (FIG. 10) is positioned over the pre-terminated fiber end sections (and the bag 80) until a first, proximal end 86 of the tube 84 is positioned over the shell 54 of the furcation body 48. The tube 84 may be a corrugated tube constructed from plastic, metal, or another suitable material. The proximal end 86 of the tube 84 may be coupled to the shell 54 of the furcation body 48 using tape, a heat shrink sleeve, adhesive, or other means. A cover 90 (FIG. 11) is then placed onto the cable assembly 62. The cover 90 in the embodiment shown comprises an expandable mesh/braided material and, for convenience, will be referred as braided cover 90. The braided cover 90 is eventually arranged to extend over the tube 84 (as discussed below), but is first slid onto the cable assembly 62 until a portion or all of the braided cover 90 is advanced past the tube 84. In fact, an amount of material of the braided cover 90 that is at least sufficient to eventually extend over the tube 84 may be positioned over the cable jacket 26 during this step. FIG. 11 illustrates the braided cover 90 being advanced over the tube 84 and onto the cable jacket 26 (not shown since it is under the braided cover 90). FIG. 12 illustrates the braided cover 90 extending rearward from the furcation body 48, with tape 92, heat shrink material, or the like being applied at multiple locations to help conform the shape of the braided cover 90 to cable assembly 62.

Figure 14:
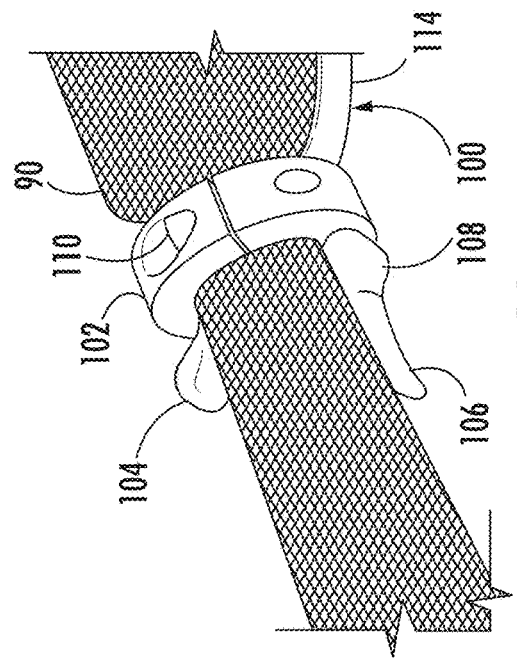
FIGS. 13 and 14 are schematic views of a clamp being used to secure a pulling band and the cover to the interconnect cable.
Figure 13:
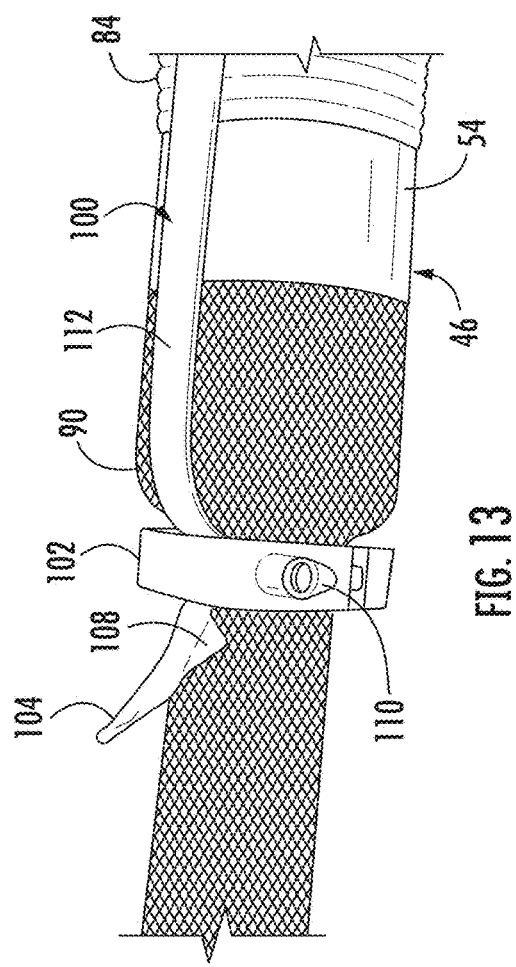

As shown in FIGS. 13 and 14, a pulling band 100 may be secured to the cable assembly 62. The pulling band 100 in the illustrated embodiment comprises a polyester pulling tape (e.g., Mule® tape) secured to the cable jacket 26 (indirectly) with a clamp 102. In particular, FIGS. 13 and 14 illustrate a first end portion 104 and a second end portion 106 of the pulling band 100 extending along the tube 84 and then over and behind the furcation body 48. The clamp 102 is arranged over the pulling band 100 and the cable jacket 26, between the furcation body 48 and knotted sections 108 of the first end portion 104 and the second end portion 106. The clamp 102 is adjustable to closely conform to the outer diameter of the cable jacket 26, which is less than the outer diameter of the furcation body 48. For example, a bolt 110 may be used to bring portions of the clamp 102 closer together until the clamp 102 securely grips the cable jacket 26. The pulling band 100 and the braided cover 90 that covers the cable jacket 26 are compressed against the cable jacket 26 when doing so. The knotted sections 108 prevent the first end portion 104 and the second end portion 106 of the pulling band 100 from being pulled through the clamp 102 when tensile loads are applied to pulling band 100, as will be described in greater detail below.

Figure 15:
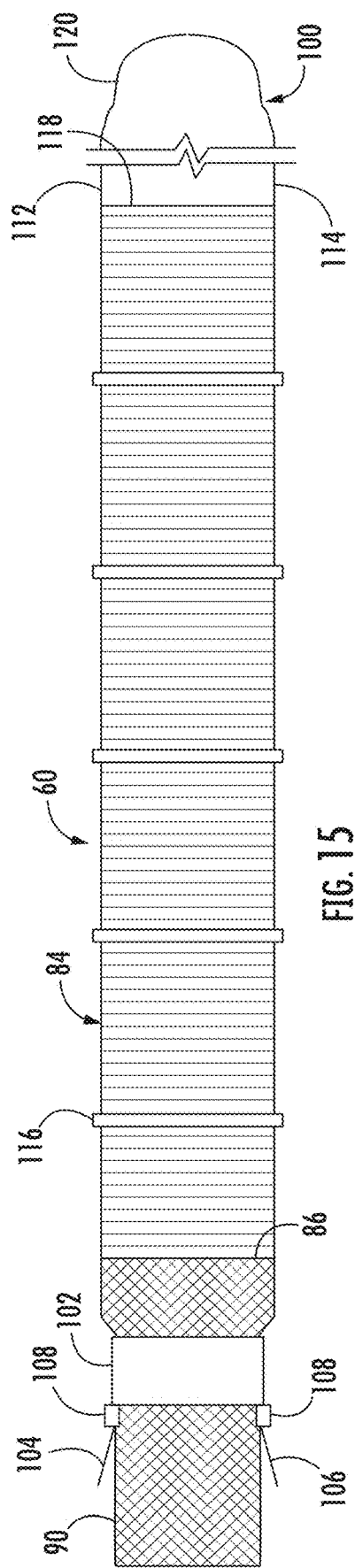
FIG. 15 is a schematic view of the pulling grip assembly of FIG. 6 partially installed on the interconnect cable, with the pulling grip assembly including the tube, the cover, the pulling band, and the clamp shown in other figures.

FIG. 15 is a schematic illustration of the pulling grip assembly 60 with the pulling band 100 arranged along the tube 84. The pulling band 100 includes a first length 112 extending from the first end portion 104 and a second length 114 extending from the second end portion 106. 104 The first length 112 and the second length 114 are arranged on opposite sides of the tube 84 (i.e., are diametrically opposite). To keep the first length 112 and the second length 114 of the pulling band 100 arranged along the tube 84, tape 116 or other means may be used to secure the pulling band 100 to the tube 84 at various locations along the tube 84. The first length 112 and the second length 114 of the pulling band 100 ultimately extend beyond a second, distal end 118 of the tube 84 and form a loop 120. In the embodiment shown, the pulling band 100 comprises a single piece of pulling tape, but in other embodiments the first length 112 and the second length 114 may be separate elements tied or otherwise joined together to form the loop 120.

Figure 17:
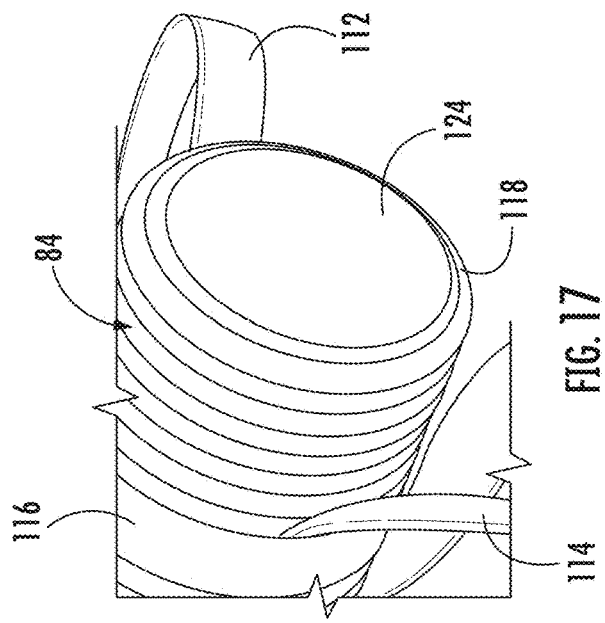
FIG. 17 is a perspective view of a distal end of the tube of the pulling grip assembly being plugged with the end plug of FIG. 16.
Figure 16:
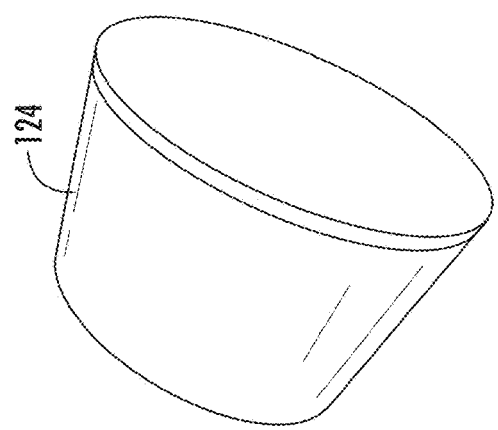
FIG. 16 is a perspective view of one example of an end plug used in the pulling grip assembly of FIG. 6.

As shown in FIGS. 16 and 17, an end plug 124 may be secured to the distal end 118 of the tube 84. The end plug 124 in the embodiment shown comprises a conical rubber plug that can be inserted into the distal end 118 of the tube 84 until interference between the end plug 124 and the tube 84 secures the elements together. The end plug 124 may conform to portions of an inner surface of the tube 84 and form a seal.

Figure 18:
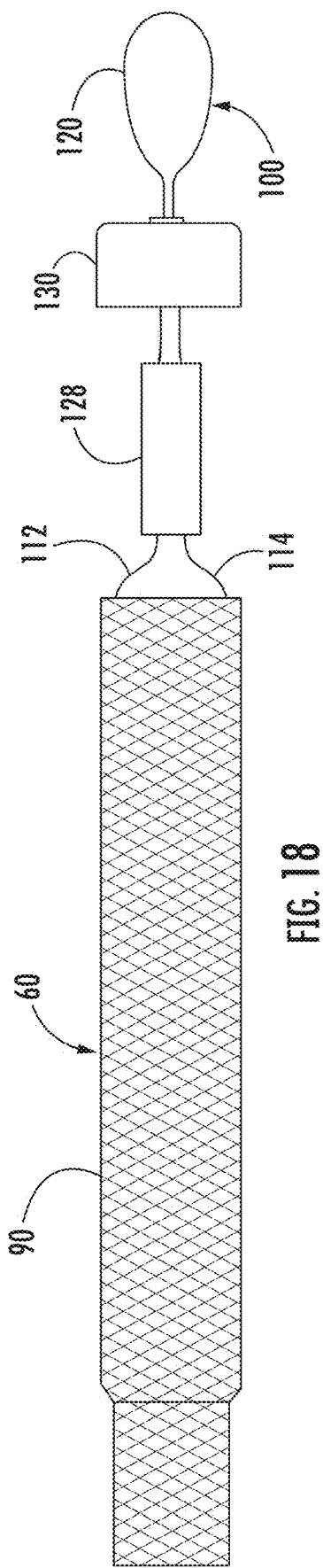
FIG. 18 is a schematic view similar to FIG. 15, but illustrates the cover pulled back over the tube, and the loop of the pulling band extending through a heat shrink sleeve and an end cap of the pulling grip assembly.
Figure 19:
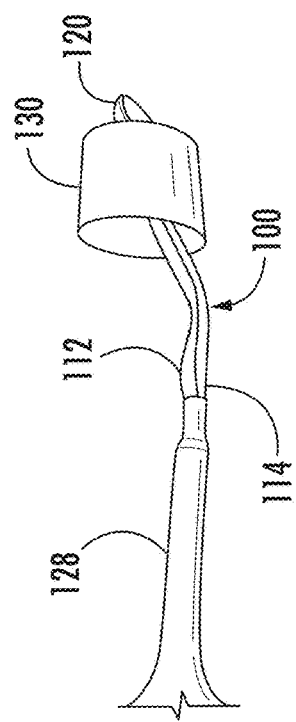
FIG. 19 is a schematic view of a portion of the loop of the pulling band after activating the heat shrink sleeve so that the end cap can be further advanced over the pulling band.

Now referring to FIGS. 15 and 18, the portion of the braided cover 90 that was behind the clamp 102 and over the cable jacket 26 may be pulled forward, back over the clamp 102 and the tube 84. Thus, the braided cover 90 is pulled back over a portion of itself (i.e., the portion secured by the clamp 102 and extending forward on the furcation body 48; see FIG. 12). The braided cover 90 may be sized such that the braided cover 90 must expand in diameter to extend over the tube 84, thereby helping the pulling grip assembly 60 maintain a profile similar to that of the tube 84. FIG. 18 also illustrates additional components on the loop 120 of the pulling band 100. In particular, a heat shrink sleeve 128 is first slid over the loop 120 and arranged proximate the distal end 118 of the tube 84. Although the braided cover 90 is shown as being spaced from the heat shrink sleeve 128 in FIG. 18, the heat shrink sleeve 128 may also be slid over a portion of the braided cover 90. The heat shrink sleeve 128 holds the first length 112 and the second length 114 closer together than compared to their arrangement along the tube 84. Indeed, the heat shrink sleeve 128 is eventually activated (i.e., shrunk) to hold the first length 112 and the second length 114 next to each other and to reduce the size of the braided cover 90 adjacent the distal end 118 of the tube 84. As shown in FIG. 19, this allows an end cap 130 that has relative small central hole (compared to the outer diameter of the end cap 130) to slide over the loop 120 and be advanced toward the distal end 118 of the tube 84. The end cap 130 is sized to be received over the distal end 118 of the tube 84 and may be secured relative to the tube 84 by way of an interference fit, adhesive, tape, or other means.

In the field (e.g., on the campus of the data center 10), the cable assembly 62 may be routed from one building (main building 12 or auxiliary building 14) to another using the pulling grip assembly 60. The loop 120 (FIG. 6) provides an attachment point for appropriate equipment (not shown) to pull the pre-terminated cable 46 through ducts that extend into and out of the buildings, and possibly between the buildings. As mentioned previously, the design of the pulling grip assembly 60 may provide for a small footprint yet at the same time protect a large number of pre-terminated optical fibers. The protection includes withstanding the forces required to pull such a large number of pre-terminated fiber end sections through ducts. In some embodiments, for example, the pulling grip assembly 60 may have a maximum outer diameter of less than 1.34 inches (53 mm) measured in a plane perpendicular to a longitudinal axis of the pulling grip assembly 60, yet still protect at least 2,880 pre-terminated fiber end sections (or, as with the pre-terminated cable 46, at least 3,456 pre-terminated fiber end sections) while a tensile load of at least 600 pounds is applied to the loop 120 of the pulling band 100. The pre-terminated cable 46 has a maximum outer diameter that is no larger than the pulling grip assembly 60. As a result, at least three cable assemblies 62 may be pulled through a duct that has an inner diameter of approximately 4 inches (102 mm), which is a common size duct on many data center campuses.

Advantageously, in addition to a small outer diameter, the pulling grip assembly 60 may have a relatively small length when considering the large number of pre-terminated fiber end sections contained within the pulling grip assembly 60. For example, in some embodiments, the pulling grip assembly 60 may have a length between that is less than 120 inches (3.05 m), as measured along a longitudinal axis of the pulling grip assembly 60 (e.g., between the beginning of the braided cover 90 on the cable jacket 26 and the end of the loop 120 of the pulling band 100), despite protecting at least 2,880 or at least 3,456 pre-terminated fiber end sections (each associated with a 12-fiber or 24-fiber MT ferrule 42). In some embodiments the length may be even shorter, such as less than 100 inches, less than 80 inches, or even less than 70 inches. The relatively small length of the pulling grip assembly 60 facilities its removal from the cable assembly 62 after being used to pull the pre-terminated cable 46 to its intended location.

Figure 20:
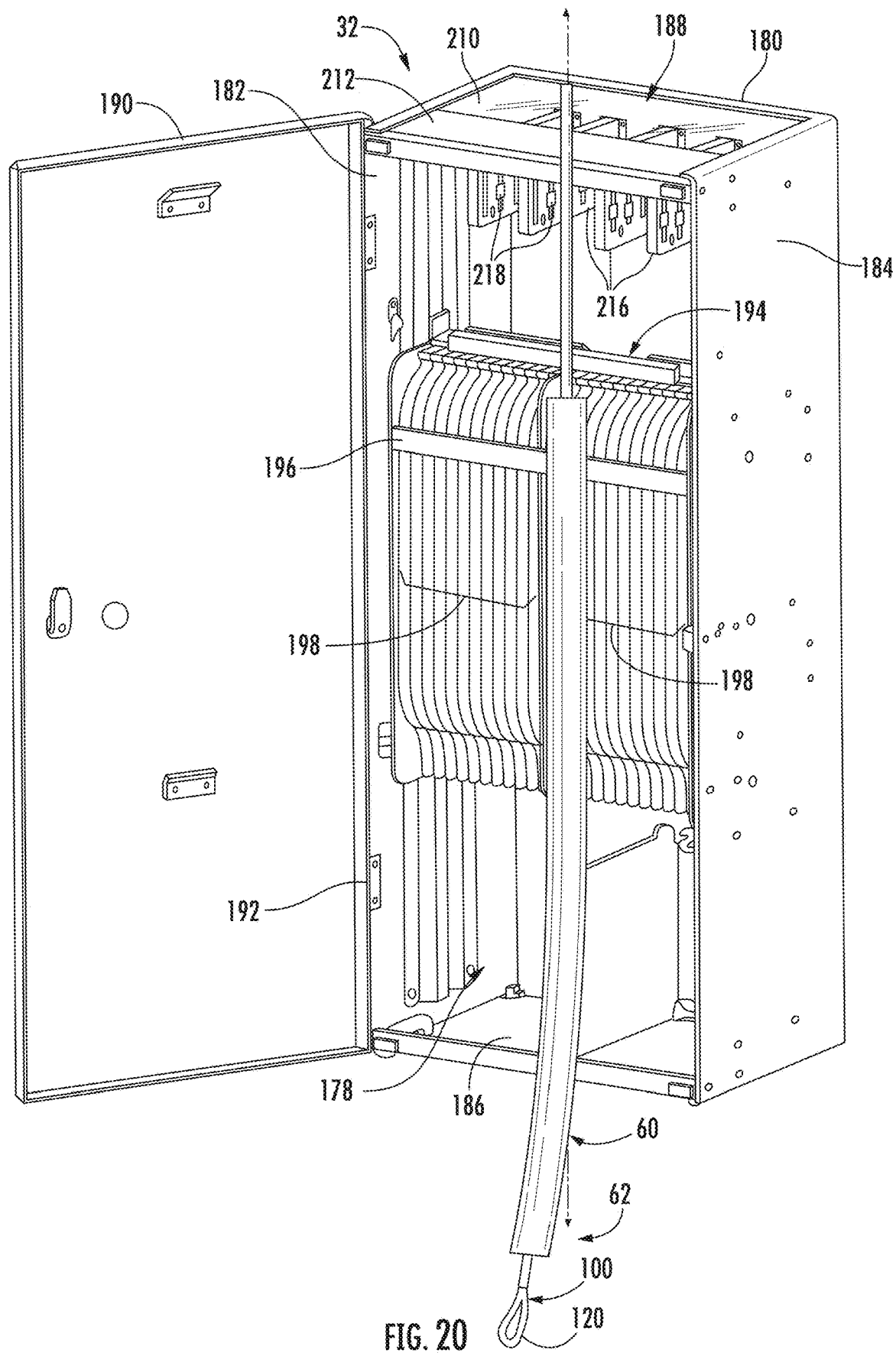
FIG. 20 is a perspective view of one example of a distribution cabinet used in the data center campus of FIG. 1.

In particular, the cable assembly 62 may be pulled to equipment intended to facilitate and store connections to the pre-terminated fiber end sections of the pre-terminated cable 46. To this end, FIG. 20 illustrates the pulling grip assembly 60 superimposed on one possible embodiment for the distribution cabinets 32 mentioned above in connection with FIG. 4. The distribution cabinet 32 may be similar to embodiments described in PCT Patent Application Publication Nos. WO 2019/079460 A1 ("the '460 publication") and WO 2019/079425 A1 ("the '425 publication"), the disclosures of which of fully incorporated herein by reference. Indeed, FIG. 20 generally corresponds to FIG. 1 of the '425 publication such that reference can be made to the '425 publication for a more complete understanding of aspects not discussed below. Only a brief overview is provided below before focusing on differences from the '425 publication that are specific to this disclosure.

As shown in FIG. 20, the distribution cabinet 32 includes various walls that are assembled together to define an interior volume 140. In particular, the distribution cabinet 32 includes a rear wall 142, a first side wall 144, and a second side wall 146 coupled to opposite sides of the rear wall 142, and a lower wall 148 and an upper wall 150 respectively coupled to a top and bottom of each of the rear wall 142, the first side wall 144, and the second side wall 146. A front door 152 is pivotally coupled to the first side wall 144 (e.g., by hinges 154) to provide selective access to the interior volume 140. The distribution cabinet 32 also includes a tray assembly within the interior volume 140 that comprises a tray housing 156 (or "carriage 156") pivotally coupled to the distribution cabinet 32 and a plurality of trays 158 coupled to the tray housing 156. The tray housing 156 may pivot/rotate outward from the interior volume 140 to facilitate access to the trays 158. The trays 158 themselves may pivot or otherwise move relative to the tray housing 156 (including being removable from the tray housing 156) to provide additional access to any given tray 158.

The '425 publication refers to the trays 158 as "splice trays" because they are intended to store fusion splice joints between the optical fibers of two different cables. Because the present disclosure relates to pre-terminated cables rather than ones that require splicing, the more generic term "distribution tray" or simply "tray" is used. The trays 158 are still intended to store joints between the optical fibers of two different cables, but the joints are in the form connection interfaces that are mated (i.e., coupled) together (e.g., by using respective adapters; not shown). The trays 158 may therefore be referred to as "patch trays 158" (or "adapter trays 158") and the distribution cabinet 32 as a "patch cabinet 32" or "patch enclosure 32".

It will be appreciated that FIG. 20 superimposes a portion of the pre cable assembly 62 that includes the pulling grip assembly 60 over the distribution cabinet 32 merely to illustrate the general principle that that pulling grip assembly 60 may be used to route/pull the end portion of the pre-terminated cable 46 to its intended destination (the distribution cabinet 32). In some embodiments, the pulling grip assembly 60 may be used to route the end portion 44 all the way into the interior volume 140 of the distribution cabinet 32. Various features may be provided in the distribution cabinet 32 to assist with receiving the pre-terminated cable 46. Although FIG. 20 illustrates a transparent rear plate 160 without openings as a rear portion of the upper wall 150, such a plate may include different sized openings for different types of cables. For example, there may be openings sized to receive the larger, high fiber-count pre-terminated interconnect cables 20, and openings sized to receive the relative smaller fiber-count indoor cables 34. A front plate 162 defining a front portion of the upper wall 150 may also be removable to assist with accessing the pre-terminated cable 46 and other cables as they are routed into the distribution cabinet 32 (e.g., through the openings in the rear plate 160, if present). Additionally, the distribution cabinet 32 may include brackets 164 below the rear plate 160 that serve as mounting locations for the pre-terminated cable 46 and other cables. Apertures 166 or other mounting features may be provided on the brackets 164 for cooperating with complementary mounting features of clips (not shown), which may be integral with the cables (e.g., part of the furcation body 48) or mounted to the cables.

Ultimately the pulling grip assembly 60 is removed from the pre-terminated cable 46 to expose the end sections 52 (FIG. 4) of the subunits 22. This may be done before or after securing the pre-terminated cable 46 to the brackets 164. Regardless, by routing the pre-terminated cable 46 into the distribution cabinet 32 before removing the pulling grip assembly 60, the amount of further positioning/routing of the pre-terminated cable 46 is limited. This may be desirable because once the pulling grip assembly 60 is removed, the end sections 52 of the subunits 22 (and, therefore, the associated pre-terminated fiber end sections) are less protected, especially in embodiments where there are exposed lengths of the ribbons 28.

The design of the pulling grip assembly 60 facilitates removal in the manner described above (i.e., after routing into the distribution cabinet 32). The relatively short length discussed above is one aspect, allowing the removal to occur after routing the pre-terminated cable 46 into the distribution cabinet 32 without having to later store large lengths of cable slack in the distribution cabinet 32 or pull back lengths of the pre-terminated cable 46 from the distribution cabinet 32. As will also be appreciated, another aspect is that the steps to remove the pulling grip assembly 60 may be performed manually without the need for more than a single tool or, in some embodiments, without the need for any tools. The only step that may require a tool is releasing the clamp 102. In the embodiment discussed above, this may involve loosening the bolt 110 with a wrench (e.g., hex wrench). In other embodiments, the clamp 102 may be designed with a quick-release mechanism that does not require a tool.

The end cap 130 and the heat shrink sleeve 128 may be removed by hand (i.e., without tools). For example, the end cap 130 may be releasable from its position over the distal end 118 of the tube 84 if there is only a slight interference fit of the end cap 130 over the distal end 118 (and over the braided cover 90). The heat shrink sleeve 128 may be releasable by hand if one or more small slits are provided in the heat shrink sleeve 128 when installing the pulling grip assembly 62 (e.g., after first activating the heat shrink sleeve 123 to hold the first length 112 and the second length 114 of the pulling band 100 together). Pulling the first length 112 and the second length 114 in opposite directions, substantially perpendicular to the one or more slits, may cause the one or more slits to propagate so that the heat shrink sleeve 128 eventually separates.

Next, the tube 84 and the pulling band 100 (still secured to the tube 84 by the tape 116) may be pulled off the shell 54 of the furcation body 48. If tape was used to secure the proximal end 86 of the tube 84 to the shell 54, such tape may need to be removed prior to pulling the tube 84 off the furcation body 48. Finally, the bag 80 sealing off the end sections 52 of the subunits 22 may then be removed, either by simply ripping the bag off the shell 54 of the furcation body 48 or by first removing tape that secures the bag 80 to the shell 54

Remaining steps to install the pre-terminated cable 46 may be minimal and do not involve the pulling grip assembly 60. For example, the end portion 44 may be ready for establishing connections to the indoor cables 34 after removing the protective material (e.g., heat shrink cover or plastic wrap) and organizing elements (e.g., bands 76) as needed, if any such items were initially applied to the end portion 44 prior to installing the pulling grip assembly 60. The connections between the subunits 22 of the pre-terminated cable 46 and the indoor cable 34 are ultimately stored in the trays 158 of the distribution cabinet 32.

The are many other alternatives and variations that will be appreciated by persons skilled in optical connectivity without departing from the spirit or scope of this disclosure. For at least this reason, the invention should be construed to include everything within the scope of the appended claims and their equivalents.

What is claimed is:

1. A fiber optic cable assembly, comprising:
a cable jacket;
distinct groups of optical fibers carried within the cable jacket and extending beyond a first end of the cable jacket;
a furcation body positioned on the first end of the cable jacket such that the distinct groups of optical fibers have respective fiber end sections extending beyond the furcation body; and
a pulling grip assembly, comprising:
a bag received over the fiber end sections and secured to the furcation body so that the bag forms a seal with the furcation body;
a tube extending from the furcation body and over the bag so that the fiber end sections are within the tube;
a clamp releasably secured around the cable jacket on a side of the furcation body opposite the fiber end sections;
a pulling band having a first end portion and a second end portion secured to the cable jacket by the clamp, wherein the clamp is arranged over the pulling band between the furcation body and knotted sections of the first end portion and the second end portion, and wherein the pulling band includes a first length and a second length that extend respectively from the first end portion and the second end portion along an outer portion of the entire length of the tube and that form a loop beyond the tube; and
a cover that is separate from the pulling band and that extends from the furcation body and over the tube, wherein:
the clamp also secures the cover to the cable jacket,
the cover extends over the first length and the second length of pulling band that are along the tube,
an end region of the cover extends beyond a distal end of the tube, and
the loop formed beyond the tube by the first length and the second length of the pulling band is accessible beyond the end region of the cover.

2. The fiber optic cable assembly of claim 1, wherein the cover comprises an expandable mesh material, and wherein the cover has an expanded configuration over the tube.

3. The fiber optic cable assembly of claim 2, wherein the pulling grip assembly further comprises:
an end cap positioned over the distal end of the tube, wherein the end region of the cover and the loop of the pulling band extend through the end cap.

4. The fiber optic cable assembly of claim 1, wherein the pulling grip assembly further comprises:
an end plug that plugs the distal end of the tube.

5. The fiber optic cable assembly of claim 1, wherein the furcation body comprises a shell filled with a polymer material.

6. A pre-terminated fiber optic cable assembly, comprising:
a cable jacket;
distinct groups of optical fibers carried within the cable jacket and extending beyond a first end of the cable jacket;
a furcation body positioned on the first end of the cable jacket such that the distinct groups of optical fibers extend beyond the furcation body; and
a plurality of connection interfaces each terminating one or more respective groups of the distinct groups of optical fibers that extend beyond the furcation body to define pre-terminated fiber end sections of the distinct groups of optical fibers; and
a pulling grip assembly, comprising:
a bag received over the pre-terminated fiber end sections and secured to the furcation body so that bag forms a seal with the furcation body;
a tube extending from the furcation body and over the bag so that the pre-terminated fiber end sections are within the tube;
a clamp releasably secured around the cable jacket on a side of the furcation body opposite the pre-terminated fiber end sections;
a pulling band having a first end portion and a second end portion secured to the cable jacket by the clamp, wherein the clamp is arranged over the pulling band between the furcation body and knotted sections of the first end portion and the second end portion, and wherein the pulling band includes a first length and a second length that extend respectively from the first end portion and the second end portion along an outer portion of the entire length of the tube and that form a loop beyond the tube; and
a cover that is separate from the pulling band and that extends from the furcation body and over the tube, wherein:
the clamp also secures the cover to the cable jacket,
the cover extends over the first length and the second length of pulling band that are along the tube,
an end region of the cover extends beyond a distal end of the tube, and
the loop formed beyond the tube by the first length and the second length of the pulling band is accessible beyond the end region of the cover.

7. The pre-terminated fiber optic cable assembly of claim 6, wherein the plurality of connection interfaces comprises a plurality of ferrules.

8. The pre-terminated fiber optic cable assembly of claim 7, wherein each ferrule of the plurality of ferrules terminates a single group of the distinct groups of optical fibers.

9. The pre-terminated fiber optic cable assembly of claim 7, wherein each ferrule of the plurality of ferrules terminates multiple groups of the distinct groups of optical fibers.

10. The pre-terminated fiber optic cable assembly of claim 6, wherein each group of the distinct groups of optical fibers comprises an optical fiber ribbon, and wherein the optical fiber ribbons collectively comprise at least 2,880 optical fibers.

11. The pre-terminated fiber optic cable assembly of claim 10, wherein the pulling grip assembly has a maximum outer diameter of less than 1.34 inches (53 mm) measured in a plane perpendicular to a longitudinal axis of the pulling grip assembly.

12. The pre-terminated fiber optic cable assembly of claim 11, wherein the optical fiber ribbons collectively comprise 3,456 optical fibers.

13. The pre-terminated fiber optic cable assembly of claim 6, further comprising:
a plurality of subunits within the cable jacket, wherein each subunit includes a subunit jacket and several of the distinct groups of optical fibers carried within the subunit jacket, each subunit of the plurality of subunits includes a subunit end section extending from the furcation body, and wherein each of the subunit end sections includes the distinct groups of optical fibers of the associated subunit extending from the associated subunit jacket.

14. The pre-terminated fiber optic cable assembly of claim 13, wherein the subunit end sections are group in pairs, and wherein each of the pairs has a different length such that the plurality of connection interfaces associated with the pairs have a staggered arrangement.

15. The pre-terminated fiber optic cable assembly of claim 6, wherein:
the furcation body comprises a shell filled with a polymer material;
the cover comprises an expandable mesh material and has an expanded configuration over the tube; and
the pulling grip assembly further comprises:
an end cap positioned over the distal end of the tube, wherein the loop of the pulling band extends through the end cap; and
an end plug that plugs the distal end of the tube.

16. A method of installing a pulling grip assembly on a fiber optic cable, wherein the fiber optic cable includes a cable jacket, distinct groups of optical fibers carried within the cable jacket and extending beyond a first end of the cable jacket, and a furcation body positioned on the first end of the cable jacket such that the distinct groups of optical fibers have respective fiber end sections extending beyond the furcation body, the method comprising:
positioning a bag over the fiber end sections;
securing the bag to the furcation body to form a seal with the furcation body;
positioning a tube to extend from the furcation body and over the bag so that the fiber end sections are within the tube;
arranging a first length and a second length of a pulling band along an outer portion of the entire length of the tube, wherein the first length and the second length extend respectively from a first end portion and a second end portion of the pulling band that are positioned on a side of the furcation body opposite the fiber end sections;
forming a loop with the pulling band beyond a distal end of the tube;
positioning a cover that is separate from the pulling band over the tube, wherein the cover is also positioned over the first length and the second length of pulling band that are along the tube, wherein the loop of the pulling band extends beyond the cover; and securing a clamp around the cable jacket, wherein the clamp is positioned over the first end portion and the second end portion of the pulling band and over the cover to secure the pulling band and the cover to the cable jacket, and wherein the clamp is arranged between the furcation body and knotted sections of the first end portion and the second end portion.

* * * * *